United States Patent
Melchor Clague et al.

(10) Patent No.: US 12,055,130 B2
(45) Date of Patent: Aug. 6, 2024

(54) CABLE BUNDLE LONGEVITY ON WIND TURBINES

(71) Applicant: INVENTUS HOLDINGS, LLC, Juno Beach, FL (US)

(72) Inventors: Jose Leonel Melchor Clague, Albuquerque, NM (US); Benjamin Wambheim, Albuquerque, MN (US)

( * ) Notice: Subject to any disclaimer, the term of this patent is extended or adjusted under 35 U.S.C. 154(b) by 0 days.

(21) Appl. No.: 17/815,591

(22) Filed: Jul. 28, 2022

(65) Prior Publication Data
US 2024/0035450 A1  Feb. 1, 2024

(51) Int. Cl.
| F03D 80/80 | (2016.01) |
| F03D 13/20 | (2016.01) |
| F03D 80/50 | (2016.01) |

(52) U.S. Cl.
CPC .............. *F03D 80/85* (2016.05); *F03D 13/20* (2016.05); *F03D 80/50* (2016.05); *F05B 2230/80* (2013.01); *F05B 2240/40* (2013.01); *F05B 2240/912* (2013.01); *F05B 2260/301* (2013.01)

(58) Field of Classification Search
CPC .......... F03D 80/85; F03D 80/50; F03D 80/88; F03D 80/881; F03D 13/20; F05B 2240/40; F05B 2240/912; F05B 2260/301
See application file for complete search history.

(56) References Cited

U.S. PATENT DOCUMENTS

| 2,258,177 | A | * | 10/1941 | Edwards | ................... F16H 7/18 |
|   |   |   |   |   | 242/615.3 |
| 8,366,396 | B2 |   | 2/2013 | Barton et al. | |
| 9,051,920 | B2 |   | 7/2015 | Prebio | |
| 10,018,189 | B1 |   | 7/2018 | tenThoren | |
| 10,408,365 | B2 |   | 9/2019 | McCarter et al. | |
| 10,541,523 | B2 | * | 1/2020 | Wang | ...................... F03D 80/85 |
| 11,228,165 | B2 |   | 1/2022 | Guo et al. | |
| 2017/0097110 | A1 |   | 4/2017 | Hamsho et al. | |

FOREIGN PATENT DOCUMENTS

| DE | 102017214152 B3 | * | 1/2019 |
| KR | 20130051309 A | * | 5/2013 |
| KR | 101563905 B1 | * | 10/2015 |

* cited by examiner

*Primary Examiner* — David E Sosnowski
*Assistant Examiner* — Maxime M Adjagbe
(74) *Attorney, Agent, or Firm* — Fleit Intellectual Property Law; Jon Gibbons

(57) ABSTRACT

A method for performing maintenance uptower of a wind turbine is described. The method begins with positioning a cable spacer relative to a yaw deck toe plate, so a portion of the cable spacer is flush with or above a top portion of the yaw deck toe plate. Prior to positioning the cable spacer, the cables may be moved into a relaxed position. Next, a plurality of adjustable length bracing bar assemblies, which are individually adjustable in length in a space defined between an inner wall of the yaw deck toe plate and the cable spacer, are placed uptower. Each adjustable length bracing bar assembly includes a first end formed with a low friction surface and a second end that is mechanically secured to the yaw deck toe plate. The low friction surface can be formed with rubber, plastic, composite, organic material, inorganic material, or a combination thereof.

20 Claims, 8 Drawing Sheets

CABLE BUNDLE LONGEVITY ON WIND TURBINES

FIELD OF THE DISCLOSURE

The present disclosure generally relates to wind turbine, and more particularly to the protection of cable bundles and cable spacers.

BACKGROUND

A wind turbine is a device that converts the wind's kinetic energy into electrical energy. The use of Wind Turbines as a renewable Energy Source Continues to Grow. Hundreds of thousands of large turbines in installations known as wind farms now generate large amounts of power.

FIG. 1 are the major uptower components of a wind turbine. A streamlined housing or nacelle 102 is affixed on top of town 104, i.e., uptower. Starting from the front of the nacelle 102, there is a rotor 122 with one or more rotor blades 124 attached. A pitch system 126 adjusts the angle of the rotor blades 124 depending on the direction of the wind 190 and the velocity of the wind 190. The rotor 122 is attached to a low-speed shaft 128 and brake 132. A gearbox 130 is attached to the low-speed shaft that converts the speed to a high-speed shaft 132. The highspeed shaft 132 is coupled to a generator to generate electricity, which is transmitted down cable bundle 160 through yaw deck opening 152, surrounded by yaw deck toe plate 154, through cable spacer 162 and down tower 104 as shown. An anemometer 142 with wind vane 144 is shown to measure the wind direction and speed. Also shown is a controller 140, which typically controls the wind turbine pitch system 126, and brake 132 based on information received from the anemometer 142 and other sources. More specifically, Note there is a yaw deck 150 with a yaw deck opening 152, a cable spacer 162, a cable bundle 160 passing through the yaw desk opening 152, surrounded by yaw deck toe plate 154, and the cable spacer 162 as shown.

Referring now to FIG. 2, FIG. 3, and FIG. 4, are a series of images illustrating a cable bundle 260 moving down towards the ground and away from the yaw deck opening 252, surrounded by yaw deck toe plate 254 and cable spacer 262, in accordance with the prior. The cable spacer 262 will often slide down the cable bundle 260, away from the nacelle, towards the ground as shown.

During this time, because the cable bundle 260 freely passes through the yaw deck opening 252, this allows the cable bundle to gain excess momentum as the turbine yaws or during high wind speed events. The unrestricted movement of the cable bundle 260 permits excess forces to be transmitted to both the yaw deck 150 and sway ring locations (not shown). These excess forces induce failures in the current protection systems, which in turn result in cable failures and turbine downtime.

SUMMARY OF THE INVENTION

A method for performing maintenance uptower of a wind turbine is described. The wind turbine includes a tower rotatably coupled to a yaw deck with a yaw deck opening, the yaw deck opening surrounded by a yaw deck toe plate with one or more cables passing therethrough. The method begins with positioning, uptower, a cable spacer relative to a yaw deck toe plate, so a portion of the cable spacer is flush with or above a top portion of the yaw deck toe plate. Prior to positioning the cable spacer, the cables may be moved into a relaxed position. Also, in another embodiment, the cable spacer itself may be replaced uptower, prior to the installation of the bracing bars.

Next, a plurality of adjustable length bracing bar assemblies, which are individually adjustable in length in a space defined between an inner wall of the yaw deck toe plate and the cable spacer, are placed uptower. Each of the adjustable length bracing bar assembly includes a first end formed with a low friction surface and a second end that is mechanically secured to the yaw deck toe plate. The low friction surface can be formed with rubber, plastic, composite, organic material, inorganic material, or a combination thereof.

In one example, the bracing bar is formed from a threaded rod, and one or more adjustment nuts are threaded thereto towards the second end of the adjustable length bracing bar assemblies. The second end is mechanically secured to the yaw deck toe plate. It can be secured by drilling, uptower, a mechanical bracing bar opening in the yaw deck toe plate. The drilling, in one example, is at equidistant circular positions around the yaw deck toe plate, such as at 120 degrees for three bracing bars. In another example, the second end is mechanically secured to the yaw deck toe plate by a clamp, weld, adhesion, or a combination thereof.

The threaded rod is placed through the mechanical bracing bar opening, with the adjustment nuts used to adjust the length in the space defined between the inner wall of the yaw deck toe plate and the cable spacer.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2, FIG. 3 and FIG. 4 are a series of images illustrating a cable bundle moving down towards the ground and way from the yaw deck opening, surrounded by yaw deck toe plate, and cable spacer, in accordance with the prior at.

DETAILED DESCRIPTION

Figure 1:
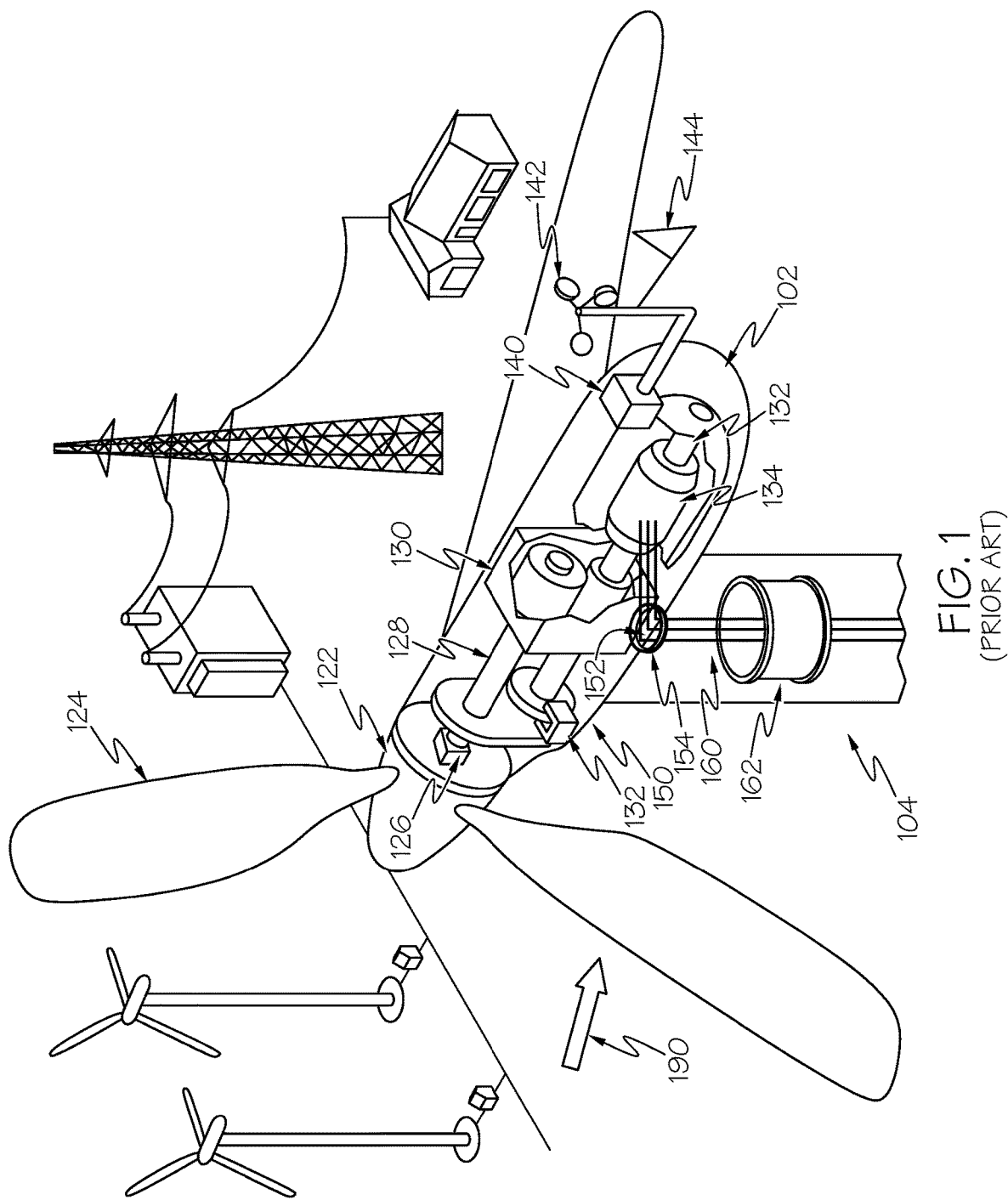
FIG. 1 is a diagram of the major uptower components of a wind turbine, in accordance with the prior art.

As required, detailed embodiments are disclosed herein; however, it is to be understood that the disclosed embodiments are merely examples to show the utility of the transporter. Therefore, specific structural and functional details disclosed herein are not to be interpreted as limiting but merely as a basis for the claims and as a representative basis for teaching one skilled in the art to variously employ the present subject matter in virtually any appropriately detailed structure and function. Further, the terms and phrases used herein are not intended to be limiting but rather to provide an understandable description of the concepts.

Non-Limiting Definitions

The terms "a", "an" and "the" are intended to include the plural forms as well unless the context clearly indicates otherwise.

The term "aftermarket" means equipment installed after the initial product was manufactured and sold.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "bracing bar" means any mechanical load bar whose length can be altered along a single axis, such as a telescoping bar, a ratcheting bar, a threaded bar.

The terms "comprises" and/or "comprising", when used in this specification, specify the presence of stated features, steps, operations, elements, and/or components but do not preclude the presence or addition of one or more other features, integers, steps, operations, elements, components, and/or groups thereof.

The term "configured to" describes the hardware, software, or a combination of hardware and software that is adapted to, set up, arranged, built, composed, constructed, designed, or that has any combination of these characteristics to carry out a given function. The term "adapted to" describes the hardware, software, or a combination of hardware and software that is capable of, able to accommodate, to make, or that is suitable to carry out a given function.

The term "coupled", as used herein, is defined as "connected," although not necessarily directly and not necessarily mechanically.

The terms "including" and "having," as used herein, are defined as comprising (i.e., open language).

The term "retrofit" means an act of adding a component or accessory to something that was not included when the wind turbine was manufactured.

The terms "uptower" means working on a wind turbine components around the nacelle and not near or on the ground.

Overview

The present invention is a retrofit solution to secure and prevent excess movement of wind turbine cable bundle passing through the yaw deck opening while minimizing turbine downtime. This retrofit solution is performed uptower, minimizing any wind turbine downtime without having to remove cables and without having to remove any existing external cable spacers. The retrofit solution also reduces cable bundle wear and thereby improves the cable bundle's longevity.

This solution reduces the free movement of the cable bundle as it passes through the yaw deck opening, thus reducing the forces seen in the rest of the cable system and preventing failures, resulting in reduced turbine downtime.

The movement of the cable bundle is restricted by installing two or more adjustable length bracing bar assemblies between the cable spacer and yaw deck toe plate. The adjustable length bracing bar assembly has a first end formed with a low friction component, such as a rubber bumper, to prevent binding with the existing external spacer when the yaw deck toe plate rotates relative to the cable spacers and relative to the cable bundle. The adjustable length bracing bar assembly has a second end held in place with a combination of hardware to secure it to the existing yaw deck toe plate.

The low friction component, or slip component, and the geometry of the bracing bar can vary broadly—plastic, metal, or any hard rubber will provide the same functionality of an in situ (i.e., in the original place) radial bearing around the cable spacer. The affixing hardware can vary in size and metallurgy, as well as the final attachment mechanism to the yaw deck toe plate, e.g., welding, adhesive, threaded, tension, or/and adhesion. The number of adjustable length bracing bar assemblies can also vary from 2 to more. In this example, there are three. However, it is important to note that other numbers are contemplated within the scope of the present invention.

In one example, the present invention can be "selectively installed" in only wind turbines with the cable spacer positioned below the yaw deck toe plate. In this case, the cable bundle will come in contact with the yaw deck opening and/or toe plate and start degrading the cable insulation. The cable bundle gains momentum as the turbine nacelle yaws to track the wind direction.

To avoid cable degradation, the cable spacer/bundle is placed in the correct vertical position, so this low friction surface is the one that makes an impact with the yaw deck toe plate. The present invention also reduces the momentum that cable gains as the nacelle yaws, causing a less violent shock to the system.

First Example of Bracing Bar

Figure 2:
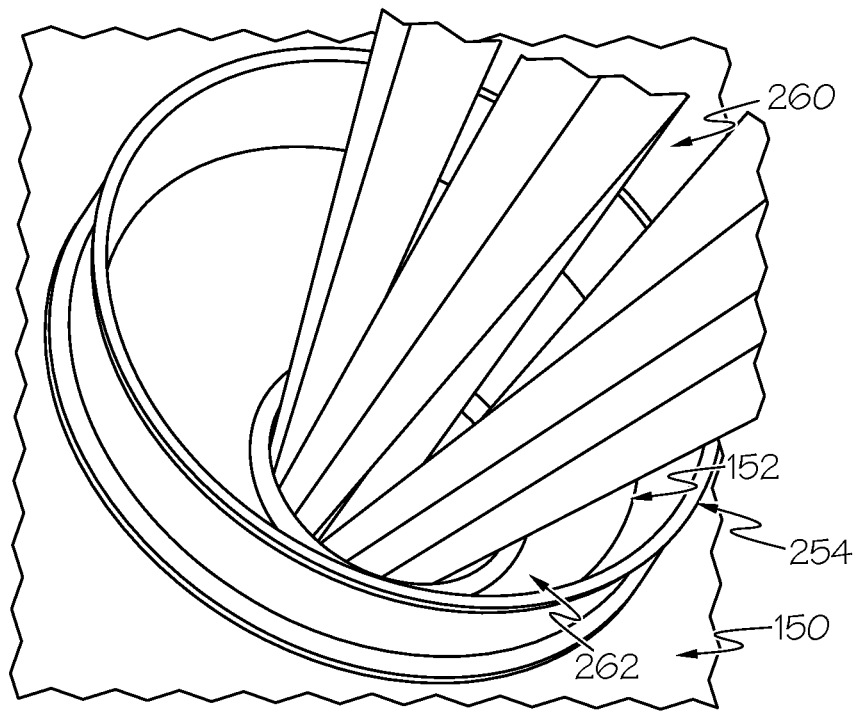
Figure 3:
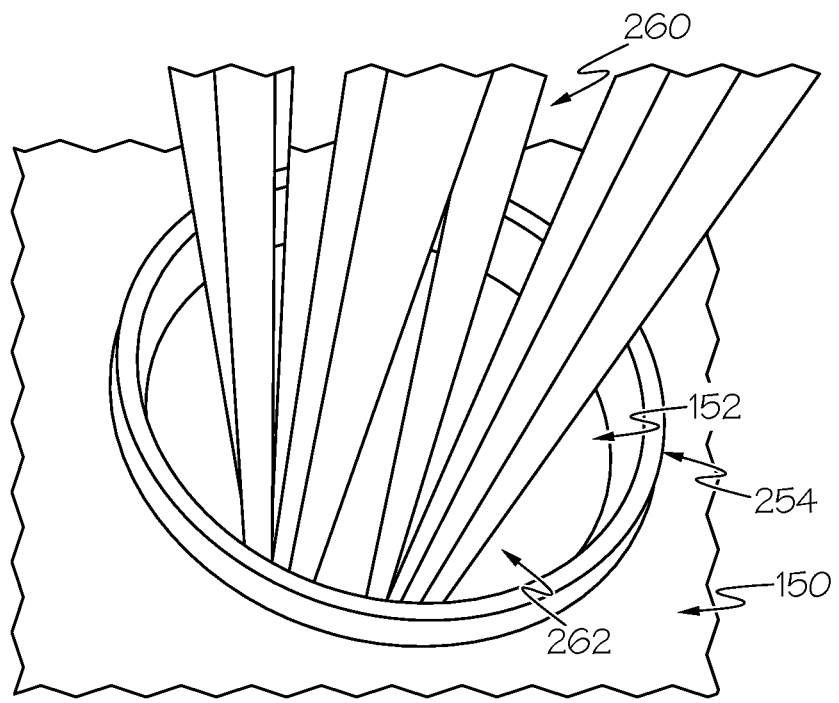
Figure 4:
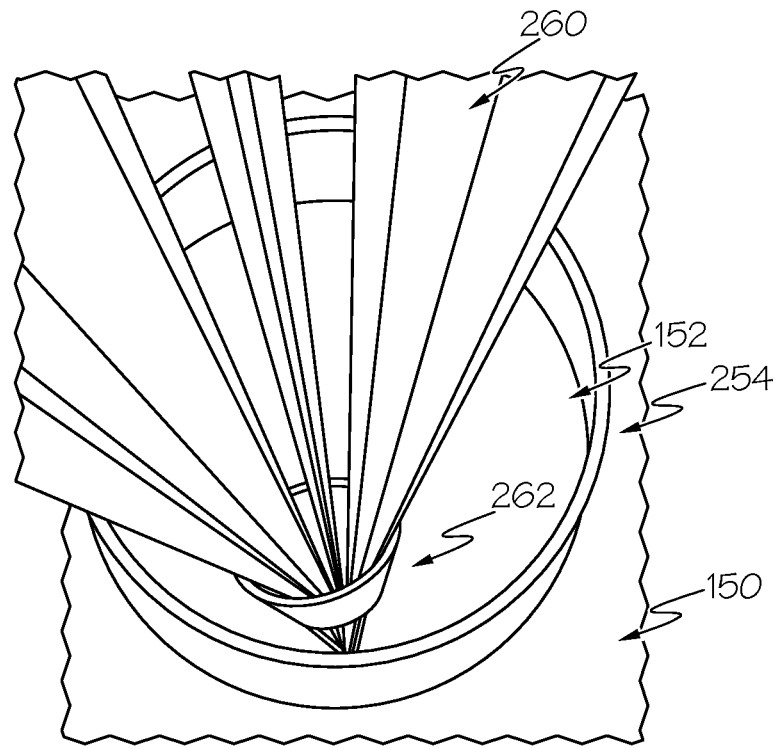
Figure 5:
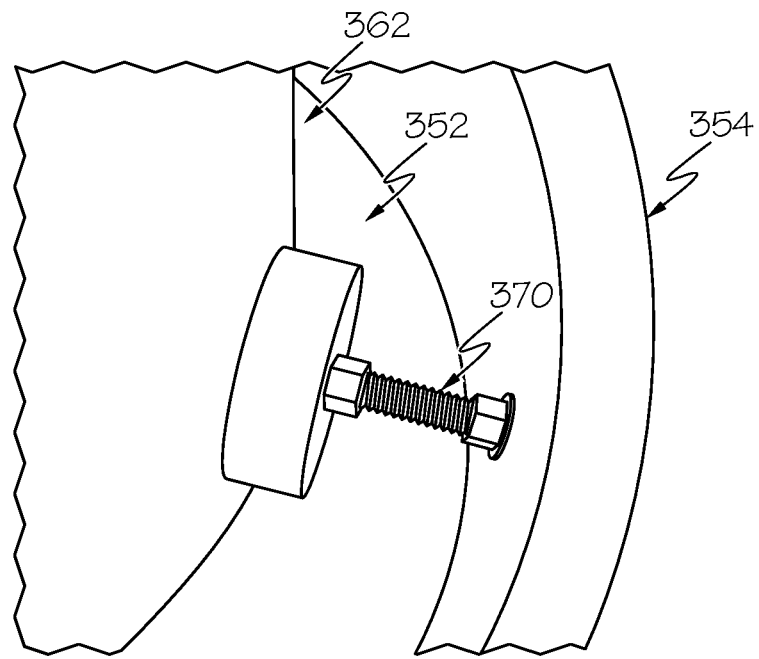
FIG. 5 is a diagram of a retrofit bracing bar, in accordance with one aspect of the invention.
Figure 6:
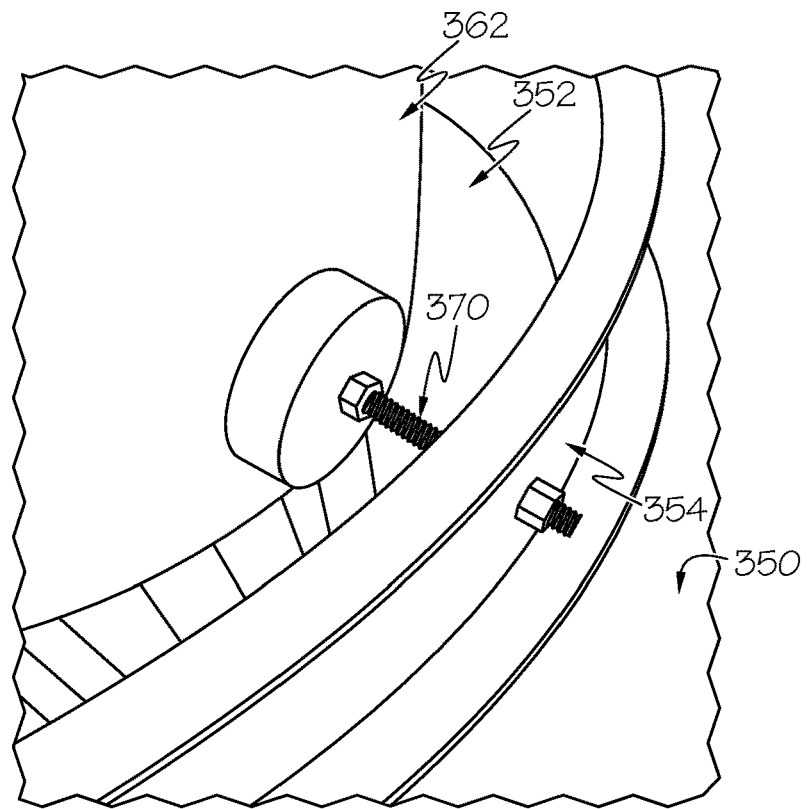
FIG. 6 is another diagram of a retrofit bracing bar of FIG. 5, in accordance with one aspect of the invention.
Figure 7:
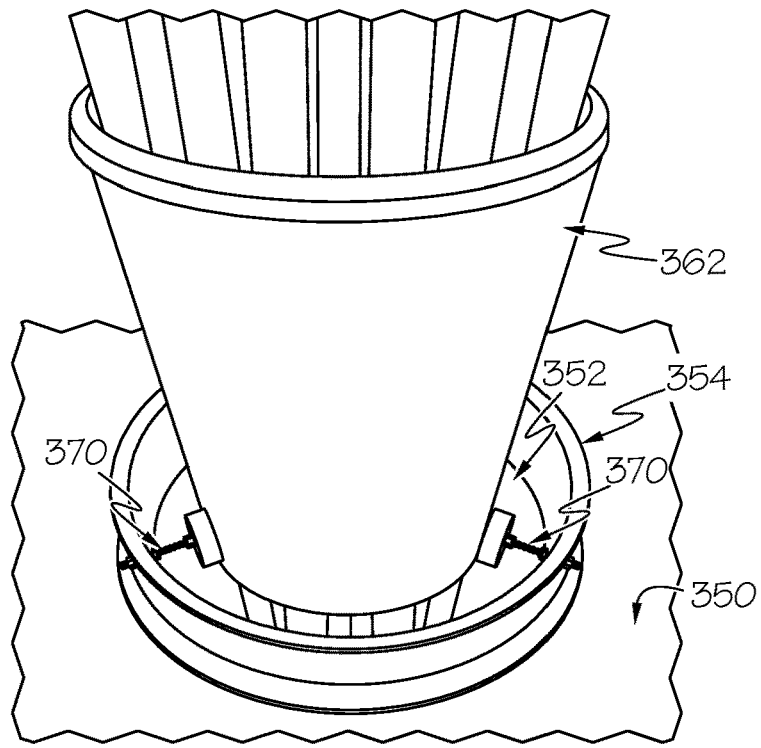
FIG. 7 is another diagram of a retrofit bracing bar of FIG. 5, in accordance with one aspect of the invention.

FIG. 5, FIG. 6, and FIG. 7 are a series of diagrams of a retrofit bracing bar 370, in accordance with one aspect of the invention. Shown is the cable spacer 362 positioned in yaw deck opening 352. The yaw deck toe plate 354 surrounds the yaw deck opening 352, as shown. A bracing bar 370 is also shown. The bracing bar 370 allows the cable spacer to rotate with wind forces but not fall into the yaw deck opening 352, as shown in FIG. 2 through FIG. 4. The bracing bar 370 with the low friction component (described further below in FIG. 8) acts as a bearing.

Figure 8:
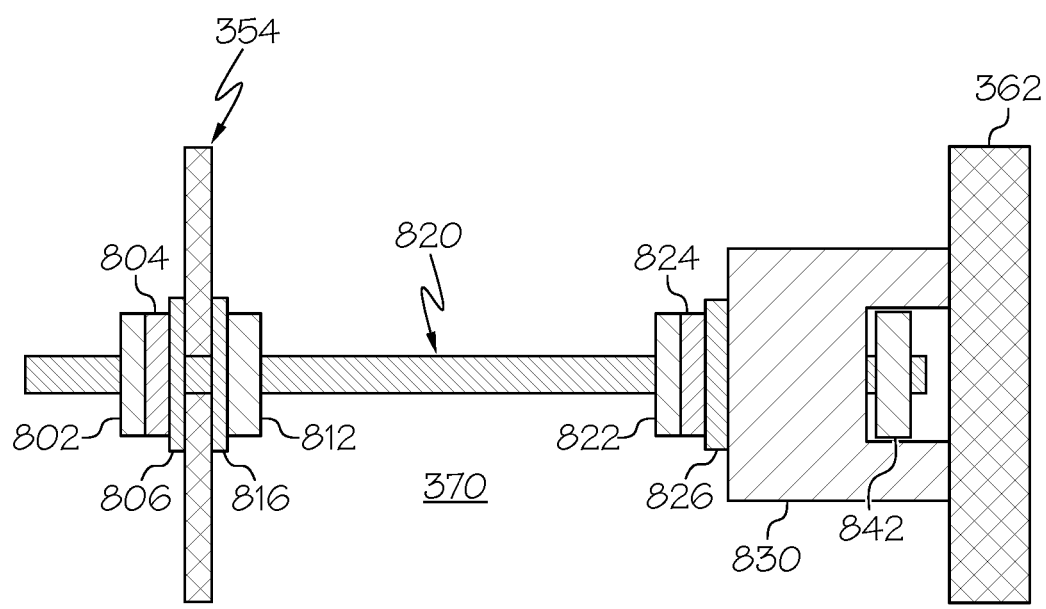
FIG. 8 is a detailed diagram of a retrofit bracing bar of FIG. 5, in accordance with one aspect of the invention.

FIG. 8 is a side view of a version of the bracing bar 370 of FIG. 5, with the orientation switched from FIG. 5, FIG. 6, and FIG. 7. In FIG. 8, the toe board end is shown on the left side rather than the right side. Shown is a threaded member 820, such as a ⅜" 16 4" Zinc Allthread (available from McMaster-Carr 95475A640). Starting from the left side, a first nut 802, is shown threadably engaged on threaded member 820. Next, a first lock washer 804 is placed in front of a first washer 806, which engages a side of the yaw deck toe plate 354 as shown. The other side of the yaw deck toe plate 354 has a second lock washer 816 and a second nut 812 is also threadably engaged on threaded member 820.

Continuing further, a third nut 822 812 is also threadably engaged on threaded member 820 as shown over a third lock washer 824 is placed in front of a second washer 826. A rubber bumper 842 is shown retained between the third nut 822 and washers 824, 826, and a fourth nut 842. Examples of the bumper are 1" SBR Rubber Bumper (available from McMasters-Carr 9540K796). Examples of nuts 802, 812, 822, 842 are ⅜"-16 Zinc Nut (available from McMasters-Carr 95462A031). Examples of lock washers 804, 824 are Zinc Lock Washers (available from McMasters-Carr 91102A760). And examples of the washers 806, 816, 826 are Zinc Washers (available from McMasters-Carr 98023A031). It is important to note other components that make up the bracing bar, including washers, lock washers, and nuts, may be substituted with other types and sizes. Stated differently, the geometry can vary broadly—plastic, metal, or any hard rubber will provide the same functionality as an in situ (i.e., in the original place) radial bearing around the cable spacer 362.

Installation Method

Figure 9:
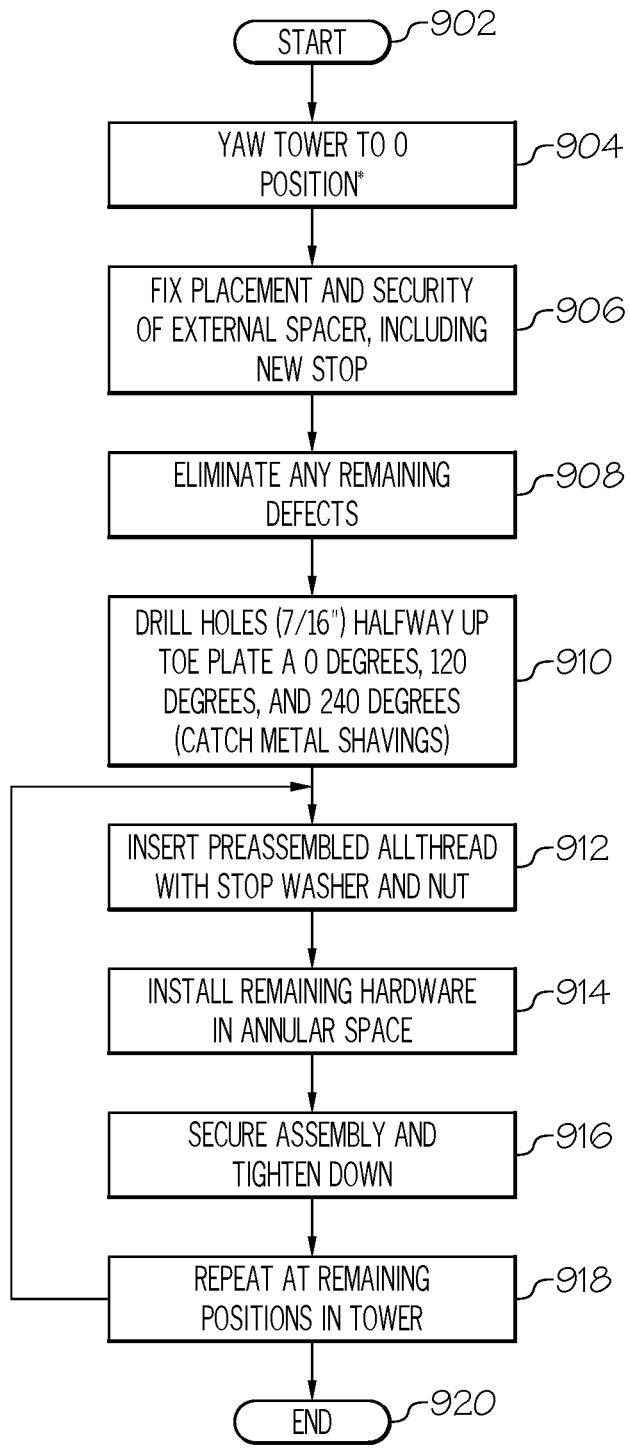
FIG. 9 is a flow diagram illustrating the major steps for installing the retrofit bracing bar of FIG. 5 through FIG. 8, in accordance with one aspect of the invention.

FIG. 9 is a flow diagram 900 illustrating the major steps for installing the retrofit bracing bar of FIG. 5 through FIG. 8, in accordance with one aspect of the invention. The in-situ process starts in step 902 and immediately proceeds to step 904, in which the yaw position is set to a set position, typically a zero position. In one example, the cables are moved to a relaxed position before sliding up or down the cable spacer relative to the yaw deck toe plate. The process continues to step 906.

In step 906, the cable spacer 362 is fixed in the desired position using temporary clamps. If the spacer 362 needs to be repaired or replaced or the cables untangled, this is performed in step 908. In another example, a cable spacer can be removed, and a new cable spacer can be installed around the cables. In another example, it is also possible to install a new cable spacer around an old existing cable spacer. The process continues to step 910

In step 910, holes are drilled in the yaw deck toe plate 354 about halfway up the side and at an approximately 120-degree position around the yaw deck opening, as shown in FIG. 5, FIG. 6, and FIG. 7. The process continues to step 912.

In step 912, the preassembled all-thread 820 with nut 802, lock washer 804, and washer 806 is inserted in the drilled hole. The process continues to step 914, in which all the remaining components are in FIG. 8 and are installed in the annular space that is defined between the yaw deck opening, the cable spacer, and the yaw deck toe plate. The process continues to step 916. In step 916, the process is repeated for steps 912 through 916 for each bracing bar 370. The process ends in step 920.

Second Example of Bracing Bar

Figure 10:
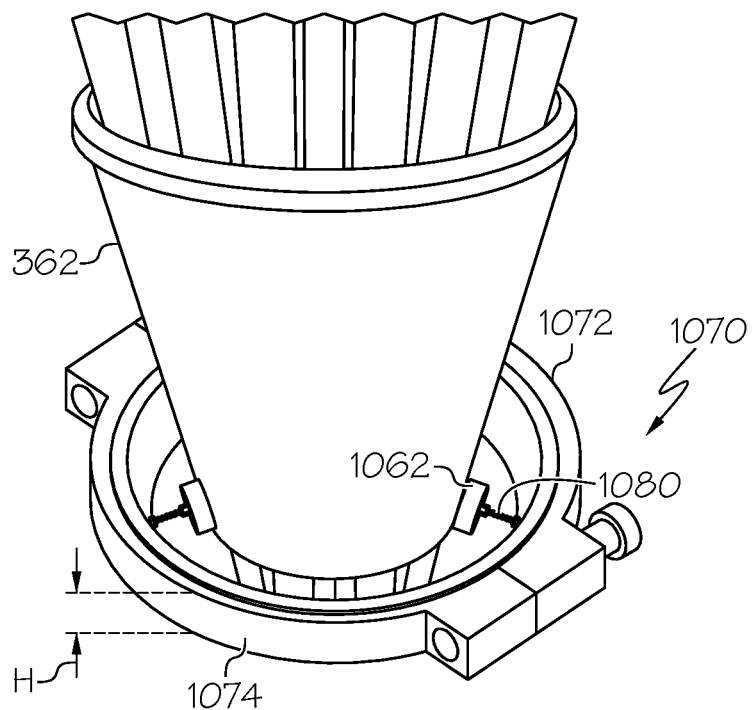
FIG. 10 is a detailed diagram of another embodiment of a retrofit bracing bar, in accordance with one aspect of the invention.

FIG. 10 is a detailed diagram of another embodiment of a retrofit bracing bar assembly 1070, in accordance with one aspect of the invention. Shown is a first-half 1072 and a second-half 1074 of bracing bar assembly 1070. In this embodiment, an inverted U-shape channel (1210, 1220) shown in FIG. 12 is sized with a height H to fit over to cover the yaw deck toe plate 354.

Figure 11:
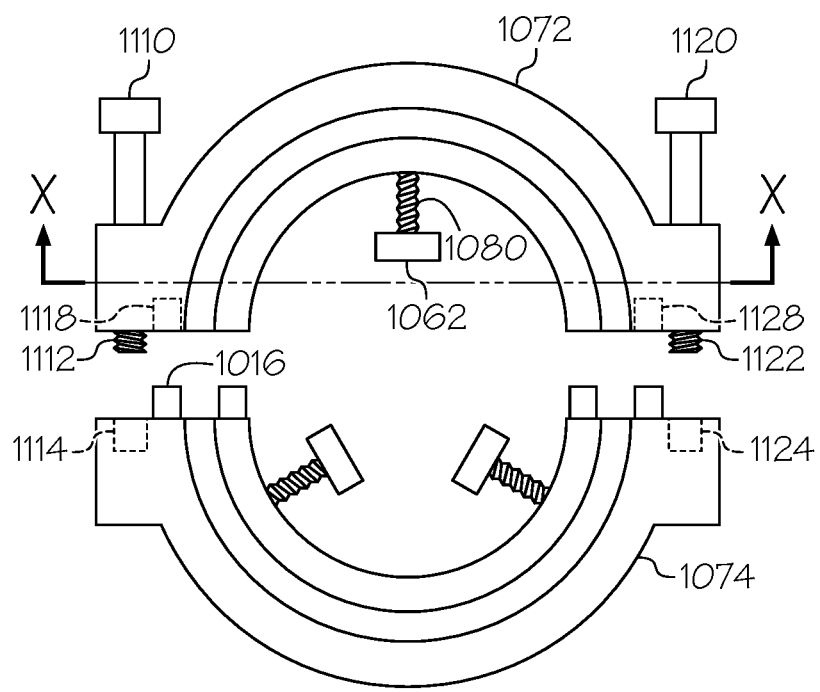
FIG. 11 is a top view of the embodiment of a retrofit bracing bar of FIG. 10, in accordance with one aspect of the invention.

FIG. 11 is a top view of another embodiment of a retrofit bracing bar of FIG. 10, in accordance with one aspect of the invention. The first-half 1072, is shown to mechanically mate with the corresponding second-half 1074. The mating is guided by pins 1116 and 1126 on the second-half 1074, which fit into openings 1118 and 1128 on the first-half 1072, as shown. A set of captive fasteners 1110 and 1120 on the first half 1072 engage corresponding threaded openings 1114 and 1124 in second-half 1074, securing the two halves firmly together. The bracing bars 1080 with low friction end 1062 are disposed at roughly equidistant around the two halves 1114 and 1124, as shown.

Figure 12:
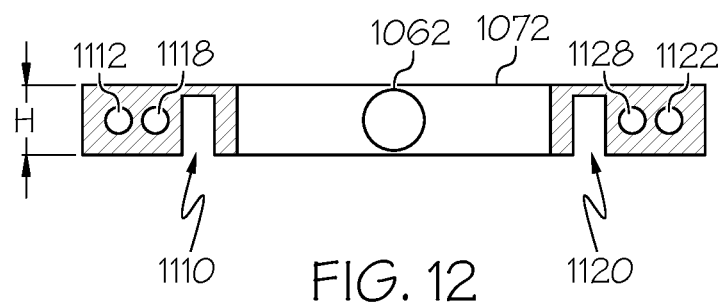
FIG. 12 is a cross-sectional view of the bracing bar of FIG. 11 taken along line X-X', in accordance with one aspect of the present invention.

FIG. 12 is a cross-sectional view of the first-half 1072 of the retrofit bracing bar of FIG. 11 taken along line X-X', in accordance with one aspect of the present invention. The details of the inverted u-shaped channels 1210 and 1220, formed with a height H to fit over and cover yaw deck toe plate 354. Note that 1210 and 1220 are one continuous arcuate inverted U-shape channel. Also shown are the captive fasteners 1110 and 1120, which are mechanically fastened to each of the two halves 1114 and 1124. Also shown are openings 1118 and 1128.

The installation using this second embodiment is similar to the first embodiment above for initial steps 902 through 908. However, drilling step 910 was eliminated. Moreover, the bracing bars 1080 can already be positioned or formed in place. This eliminates steps 912 and 914. Only the length of the bracing bars needs to be adjusted.

It is important to note that other mechanical bracing bars, such as this more ratcheting type described in U.S. Patent 9,49,759 can be used and adapted within the true scope of the present invention as long as it includes a low friction end 1062 to form an in-situ radial bearing with the cable spacer.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A bracing bar assembly to support a cable spacer in a wind turbine, the bracing bar assembly comprising:
   an annular ring with an inverted u-shaped channel sized to fit over a yaw deck toe plate, the annular ring formed in two or more sections that are fastened together to form the annual ring, and the annual ring having a center opening with the cable spacer disposed therein, the cable spacer with a single center opening surrounding a plurality of cables passing therethrough; and
   one or more adjustable length bracing bar assemblies, each with a first end formed with a low friction surface for engaging the cable spacer and a second end that is mechanically secured to the annular ring.

2. The bracing bar assembly of claim 1, wherein each of the one or more adjustable length bracing bar assemblies are formed from a threaded rod, and one or more adjustment nuts threaded thereto towards the second end.

3. The bracing bar assembly of claim 2, wherein the second end which is mechanically secured to the annular ring includes securing the second end by a threaded mechanical bracing bar opening in the annular ring, and at least one or more adjustment nuts used to adjust a length of the one or more adjustable length bracing bar assemblies in a space defined between an inner wall of the annular ring and the cable spacer.

4. The bracing bar assembly of claim 1, wherein the first end is formed with rubber, plastic, composite, organic material, inorganic material, or a combination thereof.

5. The bracing bar assembly of claim 1, wherein the second end is mechanically secured to the annular ring by a clamp, weld, adhesion, or a combination thereof.

6. A wind turbine comprising:
- a tower rotatably coupled to a yaw deck with a yaw deck opening, the yaw deck opening surrounded by a yaw deck toe plate with one or more cables passing therethrough;
- a cable spacer with a single center opening surrounding the one or more cables and within the yaw deck opening;
  - an annular ring with an inverted u-shaped channel sized to fit over a yaw deck toe plate, the annular ring formed in two or more sections that are fastened together to form an annual ring, and the annual ring having a center opening with the cable spacer disposed therein; and
- one or more adjustable length bracing bar assemblies, each with a first end formed with a low friction surface for engaging the cable spacer and a second end that is mechanically secured to the annular ring.

7. The wind turbine of claim 6, wherein each of the one or more adjustable length bracing bar assemblies are formed from a threaded rod, and one or more adjustment nuts threaded thereto towards the second end.

8. The wind turbine of claim 7, wherein the second end which is mechanically secured to the annular ring includes securing the second end by a threaded mechanical bracing bar opening in the annular ring, and at least one or more adjustment nuts used to adjust a length of the one or more adjustable length bracing bar assemblies in a space defined between an inner wall of the annular ring and the cable spacer.

9. The wind turbine of claim 6, wherein the second end is mechanically secured to the annular ring by a clamp, weld, adhesion, or a combination thereof.

10. The wind turbine of claim 6, wherein the one or more cables are worn due to the cable spacer positioned below a top portion of the yaw deck toe plate.

11. The bracing bar assembly of claim 1,
wherein the cable spacer formed from two halves to surround one or more cables that pass through a yaw deck opening and fit inside the yaw deck opening.

12. The bracing bar assembly of claim 11, wherein the cable spacer is a new cable spacer formed from two halves to surround the one or more cables and fit inside the yaw deck opening.

13. The bracing bar assembly of claim 1, wherein the second end which is mechanically secured to the yaw deck toe plate by at least one mechanical bracing bar opening in the yaw deck toe plate.

14. The bracing bar assembly of claim 13, wherein the mechanical bracing bar opening for each of the one or more of adjustable length bracing bar assemblies are at equidistant circular positions around the yaw deck toe plate.

15. The bracing bar assembly of claim 13, wherein the cable spacer formed from two halves to surround one or more cables that pass through a yaw deck opening and fit inside the yaw deck opening; and further comprising
a threaded rod is placed through the at least one mechanical bracing bar opening with the threaded rod includes at least one or more adjustment nuts used to adjust a length in a space defined between an inner wall of the yaw deck toe plate and the cable spacer.

16. The wind turbine of claim 6,
wherein the cable spacer formed from two halves to surround the one or more cables and fit inside the yaw deck opening.

17. The wind turbine of claim 16, wherein the cable spacer is a new cable spacer formed from two halves to surround the one or more cables and fit inside the yaw deck opening.

18. The wind turbine of claim 6, wherein the second end which is mechanically secured to the yaw deck toe plate by at least one mechanical bracing bar opening in the yaw deck toe plate.

19. The wind turbine of claim 18, wherein the mechanical bracing bar opening for each of the one or more of adjustable length bracing bar assemblies are at equidistant circular positions around the yaw deck toe plate.

20. The wind turbine of claim 18,
wherein the cable spacer formed from two halves to surround the one or more cables and fit inside the yaw deck opening; and further comprising:
a threaded rod is placed through the at least one mechanical bracing bar opening with the threaded rod includes at least one or more adjustment nuts used to adjust a length in a space defined between an inner wall of the yaw deck toe plate and the cable spacer.

* * * * *